United States Patent [19]

Blanco

[11] Patent Number: 5,323,647

[45] Date of Patent: Jun. 28, 1994

[54] APPARATUS AND METHOD FOR MEASURING HEIGHT VARIATIONS IN A SURFACE

[75] Inventor: Rudy Blanco, Norman, Okla.

[73] Assignee: Pave Tech Inc., Norman, Okla.

[21] Appl. No.: 626

[22] Filed: Jan. 5, 1993

[51] Int. Cl.$^5$ .................... E01C 23/00; G01B 11/24
[52] U.S. Cl. .................................. 73/146; 356/376
[58] Field of Search ............... 73/146; 33/551; 356/1, 356/4, 376, 445, 448; 250/560, 561

[56] References Cited

U.S. PATENT DOCUMENTS 4,695,163 9/1987 Schachar ........................ 356/376
4,770,532 9/1988 Ito .................................. 356/376

OTHER PUBLICATIONS

Brochure entitled "Pavement Technology" by Pave Tech, Inc. published in Jun. 1990.

*Primary Examiner*—Richard E. Chilcot, Jr.
*Assistant Examiner*—Wiliam L. Oen
*Attorney, Agent, or Firm*—Dougherty, Hessin, Beavers & Gilbert

[57] ABSTRACT

Apparatus and method for measuring height variations along a directional axis in a roadway surface from a vehicle includes a first sensor for sensing a first distance from the first sensor to a first point on the surface and generating a first signal indicative of the first distance; a second sensor for sensing a second distance from the second sensor to a second point axially separated from the first point on the surface and generating a second signal indicative of the second distance; and a computer for receiving the first and second signals and generating and recording a difference signal indicative of the difference in height of the first and second points, The first and second sensors are operated simultaneously to compensate for vertical motion of the sensors with respect to the surface.

19 Claims, 4 Drawing Sheets

APPARATUS AND METHOD FOR MEASURING HEIGHT VARIATIONS IN A SURFACE

BACKGROUND OF THE INVENTION

This invention relates to apparatus for measuring height variations in a surface and more particularly, but not by way of limitation, relates to apparatus for measuring faulting in a surface from a moving vehicle.

Various types of roadway surface condition evaluation systems are known. For example, the assignee of the present invention has a video inspection vehicle which will video the surface of a roadway and collect rutting and roughness data using ultrasonic sensors and accelerometers. A computer is used to load, manage, verify, edit, and save the information recorded about the roadway. However, the known system will not accurately measure the height of surface variations in the roadway.

A common problem related to the height of surface variations is called faulting. Faulting occurs in concrete slab roadways and at joints in roadways and bridges. For example, it is common to find faults at concrete slab joints, bridge expansion joints, bridge approach slabs, breaks or cracks in the roadway, and the like. Although the assignee's previous system will detect the presence of faults, it will not accurately measure the height of faults and other variations in the roadway surface. It is desirable to be able to accurately measure and record faults and other height variations in a roadway surface from a moving vehicle in order to facilitate and reduce the cost of maintaining roadways. That is, in order to be able to assess the severity of faulting and surface deterioration in roadways, determine whether maintenance is required, and accurately locate where the maintenance is required, it is necessary to be able to accurately measure faulting and other surface height variations from a moving vehicle.

Therefore, there is a need for apparatus and method for measuring height variations in a surface, such as a roadway, from a moving vehicle. There is also a need for such a sensor which will compensate for vertical motion of the sensing device and vehicle with respect to the surface.

SUMMARY OF THE INVENTION

The present invention is contemplated to overcome the foregoing deficiencies and to meet the above-described needs. In accomplishing this, the present invention provides a novel and improved apparatus and method for measuring height variations along a directional axis in a surface from a vehicle movable along the directional axis and surface.

The invention comprises a set of sensing means, including a first sensing means and a second sensing means; and a computer means. The first sensing means senses a first distance from the first sensing means to a first point on the surface and generates a first signal indicative of the first distance. The second sensing means senses a second distance from the second sensing means to a second point on the surface and generates a second signal indicative of the second distance. The second point is axially separated from the first point along the directional axis. The computer means receives and records the first and second signals. The computer means may also calculate the difference between the first and second signals, generate a difference signal indicative of the difference in height of the first and second points, and record the difference signal. At least two sets of sensing means may be used with the sets being transversely spaced from each other on the vehicle with respect to the directional axis.

The preferred first and second sensing means simultaneously sense the first and second distances in order to compensate for vertical motion of the first and second sensing means with respect to the surface. The first and second sensing means are defined as sensing the first and second distances at preselected intervals along the surface. The first and second sensing means are also defined as sensing the first and second distances at preselected intervals and at a predetermined frequency in order to form a series of discrete, contiguously sensed intervals along the surface. The invention includes an odometer for measuring the distance traveled by the vehicle and generating an odometer signal; and the computer means receives and records the odometer signal and correlates the odometer signal with the difference signals in order to identify and record the location of the height variations, as defined by the difference signals, along the surface.

BRIEF DESCRIPTION OF THE DRAWINGS

The present invention will be better understood by reference to the example of the following drawings.

DETAILED DESCRIPTION OF THE PREFERRED EMBODIMENTS

Figure 1:
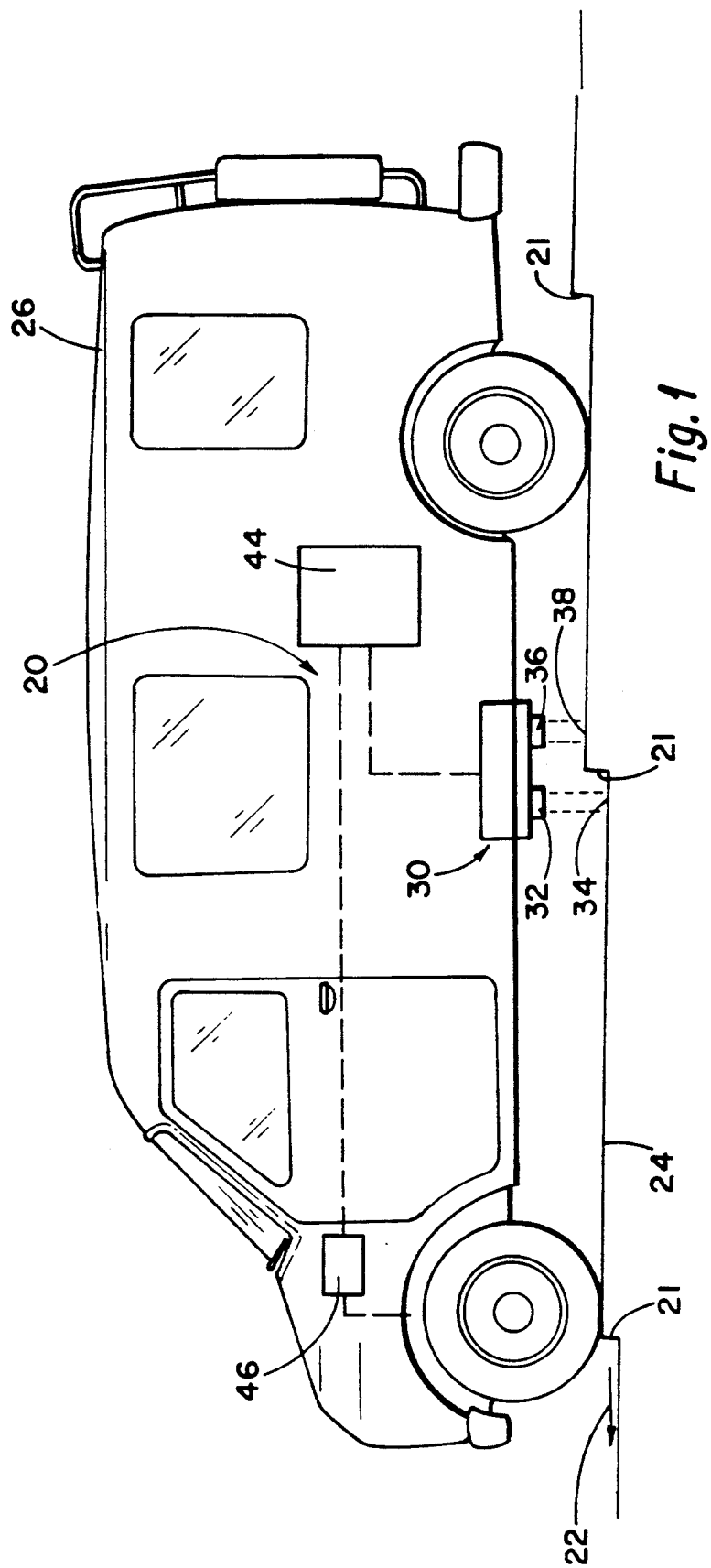
FIG. 1 is a schematic diagram of an embodiment of the apparatus of the present invention.

Preferred embodiments of the invention will now be described with reference to the drawings. Like reference characters refer to like or corresponding parts throughout the drawings and description.

FIGS. 1-5 present embodiments of the apparatus and method of the present invention, generally designated 20, for measuring height variations, such as faults 21, along a directional axis 22 in a surface 24. Although the preferred embodiment, and the apparatus and method as described herein, are used for measuring height variations in a roadway surface from a motor vehicle 26, it is intended to be understood that the invention may be adapted to measure height variations in virtually any surface from any type of vehicle. For example, the apparatus 20 may be attached to a stationary object and the surface 24 may be the surface of a material which is movable with respect to the stationary object to which the apparatus 20 is attached.

Referring to the example of FIG. 1, the apparatus 20 may be generally described as including a set 30 of sensing means. Preferably, the set 30 of sensing means includes a first sensing means 32 for sensing a first distance from the first sensing means to a first point 34 on the surface and generating a first signal indicative of the sensed first distance; and a second sensing means 36 for sensing a second distance from the second sensing means 36 to a second point 38 on the surface 24 and generating a second signal indicative of the second distance. The first and second sensing means 32, 36 are positioned so that the second point 38 is axially separated from the first point 34 along the directional axis 22. Although the set 30 is described as including a first and second sensing means 32, 36, more than two sensing means may be used in each set for such purposes as data verification, backup sensing, enhanced fault profiling and mapping, etc. The sensing means 32, 36 may be located and oriented in any desired manner which will achieve the desired sensing functions. In the preferred embodiment, the sensing means 32, 36 are directed approximately perpendicularly to the surface 24 and the sensing means 32, 36 in each set 30 are aligned along the directional axis 40 of the vehicle, i.e., the sensing means 32, 36 of each set 30 define an axis which is about parallel with the directional axis 40 of the vehicle. It is not necessary that the sensing means 32, 36 be axially aligned, although it is preferable.

Figure 2:
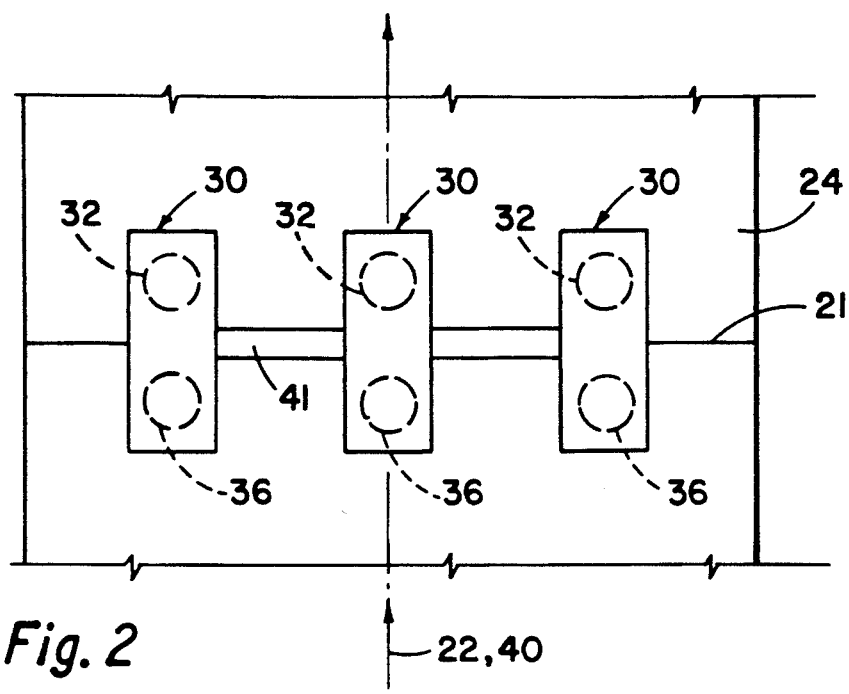
FIG. 2 is a schematic plan view of an embodiment of the sensing means of the present invention.

As illustrated in FIG. 2, the apparatus 20 may include multiple sets 30 of sensing means 32, 36. The multiple sets 30 should be transversely spaced (with respect to the directional axes 22, 40) from each other on the vehicle 26. The multiple, transversely spaced sets 30 may be used to produce three-dimensional mapping or profiling of the height variations in the surface 24. The transverse spacing of the sets 30 may be selected to provide a desired resolution of the mapping in the transverse dimension, i.e., the closer the sets 30 are together the higher will be the resolution. When the apparatus 20 is used on a roadway, multiple sets 30 may be used and placed to measure height variations across the width of an entire traffic lane of the roadway, or across any desired width. It is important that the computer means 44, discussed below, be programmed to know the relative axial and transverse locations of the sets 30 on the vehicle 26 in order to create an accurate three-dimensional map. This may be facilitated by mounting the multiple sets 30 on a common reference, such as a transverse bar 41 or other alignment mechanism across the vehicle.

In the preferred embodiment, the first and second sensing means 32, 36 of each set 30 simultaneously sense the first and second distances in order to compensate for vertical motion of the first and second sensing means 32, 36 with respect to the surface 24. Motor vehicles typically move up and down with respect to the roadway surface as they travel along the roadway. Since the first and second sensing means 32, 36 are mounted on the vehicle 26, they move vertically with the vehicle 26. By operating the sensing means 32, 36 such that they measure the first and second distances simultaneously, the first and second distances are measured as nearly as possible from the same elevation of the vehicle 26 (and the first and second sensing means 32, 36) with respect to the surface 24; and, therefore, any difference in the first and second distances is created predominantly by the difference in height variations in the surface, and the effect of the varying elevation of the vehicle 26 with respect to the surface 24 is largely canceled. Preferably, the first and second sensing means are located approximately midway between the front and rear wheels of the vehicle, and more preferably, the first and second sensing means 32, 36 are located at equal axial distances from the midpoint between the wheels of the vehicle (e.g., the first sensing means 32 located at four inches from the midpoint toward the front wheels and the second sensing means 36 located at four inches from the midpoint toward the rear wheels) in order to minimize the effect of pitch movement of the vehicle on the accuracy of the measurements of the first and second distances.

In the preferred embodiment, the first and second sensing means 32, 36 sense the first and second distances at preselected intervals 42 along the surface 24. More preferably, the first and second sensing means 32, 36 sense the first and second distances at preselected intervals 42 and at a predetermined frequency in order to form a series of discrete, contiguously sensed intervals 42 along the surface 24. In other words, referring to the example of FIG. 3, the frequency of the measurements by the first and second sensing means 32, 36 is predetermined so that the sensings of the first and second sensing means 32, 36 provide a series of discrete, contiguously sensed intervals 42, 42a, 42b, etc. along the surface 24 and thereby measure the entire surface 24 along the directional axis for height variations, as further discussed below.

Computer means 44 is provided for receiving and recording the first and second signals. Depending upon the type of sensing means 32, 36 used, the first and second signals may be in analog "voltage or current" or digital form. The computer means 44 may be used to transfer the first and second signals and other data to another computer (such as a computer in the user's office) for data processing similar to that discussed below. In the prototype apparatus and method 20, the computer means 44 is also used for calculating the difference between the first and second signals, generating a difference signal (based on the difference in the first and second signals) indicative of the difference in height of the first and second points 34, 38, and recording the difference signal. In the prototype apparatus 20, the computer means 44 also controls the transmission and reception of the first and second signals by the first and second sensing means 32, 36 and controls the frequency of the sensings (and thereby the frequency of intervals 42) by the first and second sensing means 32, 36. In order to calculate the distances represented by the first and second signals, the computer means 44 must know the transmission time of the "sensing" signal (i.e., the time it takes the sensing signal to travel from the sensing means 32, 36 to the first or second point 34, 38 and return to the transmitting sensing means 32, 36) and the speed at which the sensing signal travels. The computer means 44 can calculate the transmission time by recording the "trigger" time (the time at which the computer means 44 triggers the transmission of the sensing signal) and the "reception" time at which the transmitted signal returns or is received by the transmitting sensing means 32, 36; and determining the difference in the trigger and reception times. Depending on the type of sensor 32, 36 used, the process of calculating the distance to the first or second point 34, 38, based on the time it takes the first or second signal (which will normally be a light, sound, or other wave form signal) to travel to the surface 24 and back to the sensor 32, 36, may be executed in the computer means 44 or by the sensor 32, 36 itself. If the calculation is made by the sensor 32, 36 itself, the sensor 32, 36 will produce an analog or digital signal which is proportional to the distance measured. In the prototype apparatus 20, the first and second sensing means 32, 36 are ultrasonic sensors and, to ensure simultaneous operation (triggering) of the ultrasonic sensors, the sensors use a common trigger wire from the computer means 44.

Referring to the example of FIG. 1, the prototype apparatus 20 includes an odometer 46 for measuring the distance traveled by the vehicle 26 (normally the distance along the directional axis 22 of the surface 24) and generating an odometer signal indicative of the distance traveled. The odometer 46 may be the vehicle odometer, a device for converting the output of the vehicle odometer into a form compatible with the computer means 44, a meter attached to one of the wheels or the transmission of the vehicle, or equivalent. In the prototype apparatus, the odometer signal is a series of pulses with a pulse being generated for each preselected increment of travel of the vehicle 26. The computer means 44 receives and records the odometer signal and correlates the odometer signal with the sensings of the sensing means 32, 36 and/or the difference signal in order to identify and record the location of the height variations, as defined by the difference signal, along the surface 24. For example, the computer means 44 will print out a chart, similar to that illustrated in FIG. 5, which identifies the sensed faults 21 and relates them to the pavement length or the distance traveled from the starting point. The computer means 44 may also use the odometer signal to relate the faults 21 to highway mileposts or other known physical references. The odometer and odometer signal are used by the computer means 44 to stop the operation of apparatus 20 when the vehicle stops and resume operation of the apparatus 20 when the vehicle begins moving again. Similarly, the odometer 46 and odometer signal are used to adjust the frequency at which the sensing means 32, 36 are operated as the speed of the vehicle 26 varies, so that overlap or distance between intervals 42 and between difference signals remains constant as the speed of the vehicle varies.

Figure 4:
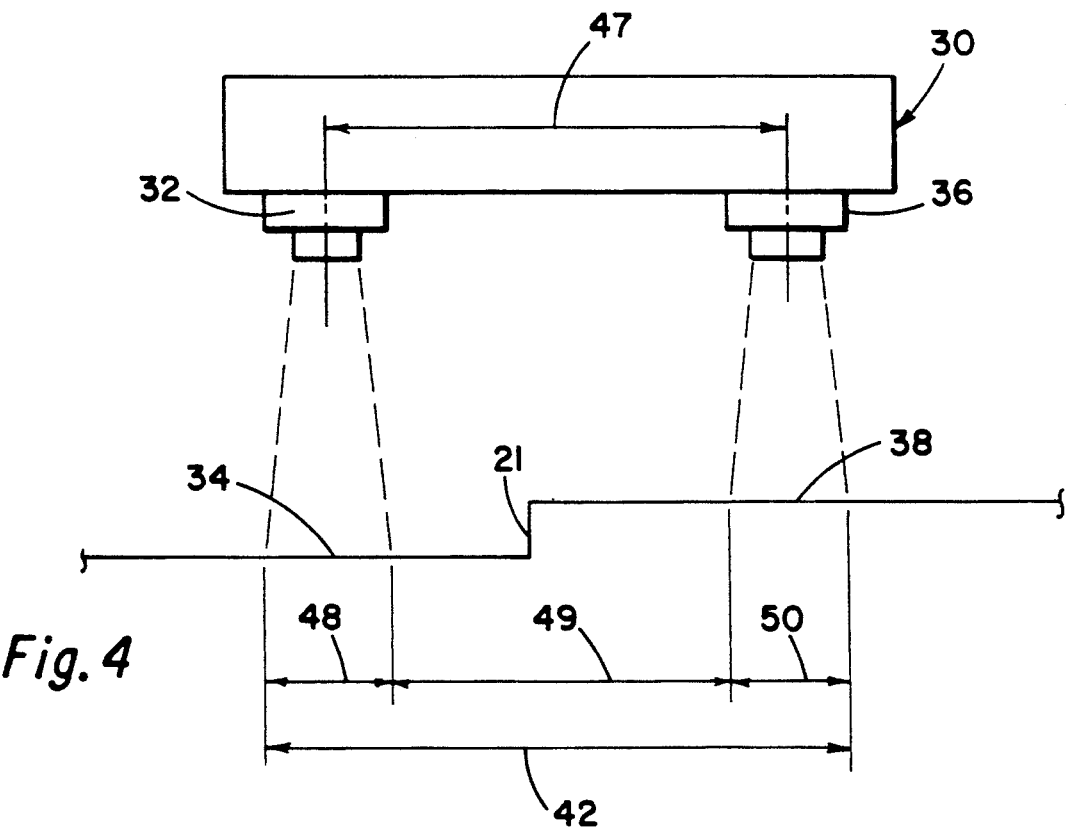
FIG. 4 is a schematic side view of an embodiment of the sensing means of the present invention.
Figure 3:
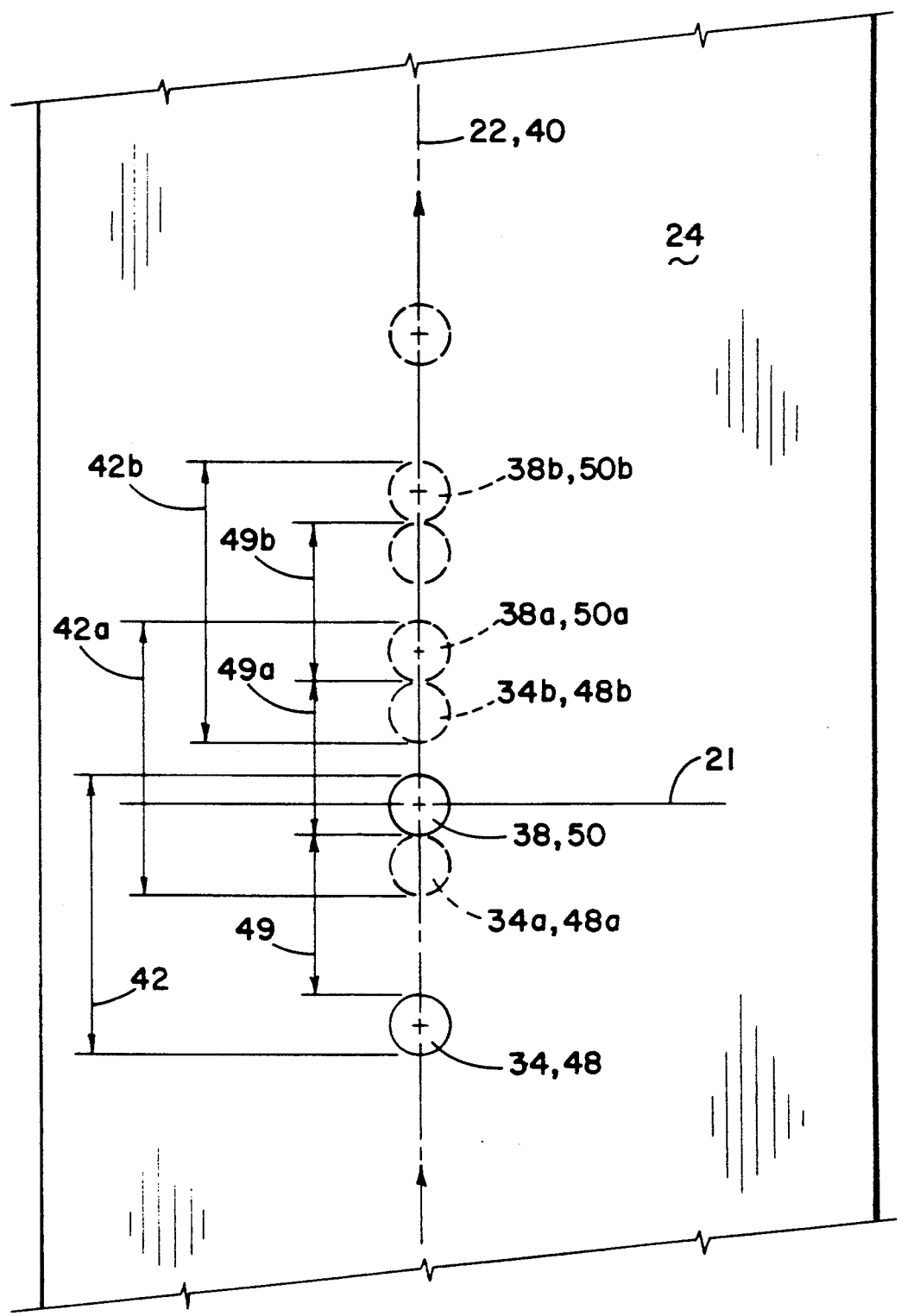
FIG. 3 is a diagram illustrating an embodiment of the overlapping intervals of the present invention.

The axial spacing 47 between the sensing means 32, 36 should be selected to ensure that the measurements or sensings taken by the sensing means 32, 36 cover 100% of the directional axis 22 along which the sensing means 32, 36 is moved; and to ensure that the same fault 21 is not measured or sensed within the "footprint" 48, 50 of each sensing means 32, 36 around the first and second points 34, 38, respectively, as illustrated in FIGS. 3 and 4. (For purposes of this discussion, the axial spacing 47 is defined as being the axial distance between the centerpoints of the sensing means 32, 36.) The factors which influence the minimum acceptable axial spacing 47 between the sensing means 32, 36 include the sensing speed of the sensing means (i.e., the time it takes the sensing means to transmit and receive the sensing signal and thereby generate the first and second signals), the footprint area 48, 50 of the sensing means 32, 36 about the first and second points 34, 38; the normal height of the sensing means 32, 36 above the surface 24; the maximum speed of the vehicle 26 during operation of the apparatus 20; and the desired frequency of intervals 42 and difference signals.

The prototype apparatus 20 uses ultrasonic sensors 32, 36 (manufactured by Polaroid Corporation) as the first and second sensing means 32, 36. The ultrasonic sensors 32, 36 will be discussed to exemplify the determination of the minimum axial distance between the first and second sensors 32, 36 as well as the operation of the sensors 32, 36. Ultrasonic sensors are the slowest sensors (because the ultrasonic "sensing" signals are transmitted at the speed of sound). In the prototype apparatus, the odometer 46 generates a pulse (odometer signal) for every twelve inches of travel of the vehicle 26 and the frequency of the odometer pulses is averaged by the computer means 44. The computer means 44 uses the average frequency of the odometer pulses to trigger a measurement or sensing by the sensing means 32, 36 for every six inches of travel and thereby produce a difference signal for every six inch increment of travel by the vehicle 26 along the surface 24. This is contemplated to be the maximum reliable operating speed/frequency for ultrasonic sensors located about six inches above the surface 24 and at a maximum vehicular speed of 65 miles per hour. The frequency of the odometer pulses and the axial distance between the sensing means 32, 36 may be selected as desired to accommodate a particular apparatus 20, sensing means 32, 36, operating characteristics, vehicular speed, resolution preference, etc.

The footprint 48, 50 is the area on the surface 24 around the first and second points 34, 38 from which the sensor 32, 36 bounces or reflects its sensing signal for determining the first and second distances. The footprint area 48, 50, particularly for ultrasonic sensors, is dependent on the distance from the sensor 32, 36 to the surface 24. For example, ultrasonic sensors which are 1.5 inches in diameter and located six inches above the surface 24 have an approximate footprint area 48, 50 of two square inches; and this footprint area 48, 50 increases or decreases proportionately to the distance between the sensor 32, 36 and the surface 24. If a fault 21 falls within a footprint, the accuracy of the first or second signal received from the footprint containing the fault is uncertain. Since the apparatus 20 uses the difference in the first and second signals to determine fault or height variations, it is desirable that every fault and height variation fall in the subinterval 49 between the footprints 48, 50 (as exemplified in FIG. 4) of the sensors 32, 36 (and not fall within a footprint) at least once in order to provide the highest possible accuracy in the difference signals and fault measurement. As discussed with the prototype apparatus 20 and exemplified in FIGS. 3 and 4, the intervals 42 include the area of the footprints 48, 50 and the subintervals 49 exclude the area of the footprints 48, 50.

It is also desirable to make the axial distance represented by each difference signal along the surface 24 as short as possible to increase the resolution of the data produced by the apparatus 20. Therefore, by way of example, if it is desired to trigger the sensing means 32, 36 and generate a difference signal for every six inch increment of travel; and to ensure that the same fault 21 does not fall within both footprints 48, 50 and that every fault and height variation falls in a subinterval 49; the ultrasonic sensors 32, 36 should have an axial spacing 47 of at least eight inches (the six inch increment of travel plus the distance (one inch) to the center of each footprint along the directional axis 40). By using eight inch axial spacing 47, if the fault 21 falls in the two square inch footprint 48 of the first sensor 32 during the difference signal of interval 42, the same fault 21 will fall in the subinterval 49 between the footprints 48, 50 during the next occurring difference signal. In other words, the preferred sensors 32, 36 are axially spaced eight inches and are triggered to generate a difference signal every six inches in order to create an overlap between the difference signals/intervals 42, 42a, 42b, etc. (best illustrated in FIG. 3) which will ensure that a fault 21 or other height variation is measured at least once in the subinterval 49, 49a, 49b, etc. between the footprints 48, 50, excluding the area of the footprints; and which will ensure that the subintervals 49, 49a, 49b, etc. form a series of discrete, contiguously sensed subintervals 49, 49a, 49b, etc. along the surface 24. If the sensors 32, 36 were axially spaced six inches, a fault 21 which fell in the first footprint 48 during interval 42 would fall in the second footprint 50 during interval 42a (assuming a triggering of the sensing means 32, 36 every six inches); and if the sensors 32, 36 were axially spaced less than six inches, a fault 21 falling in the first footprint 48 would not be measured again (assuming a six inch triggering), as the second occurrence would fall outside the next subinterval 49.

Other types of sensing means 32, 36, such as laser and infrared sensors, may be used. Laser sensors are the fastest operating sensors (since they operate at the speed of light), have a footprint of approximately one-quarter square inch, and may therefore be used for axial spacings as small as two inches and to provide a higher resolution of the height variations along the directional axis 22.

As previously mentioned, the computer means 44 operates the sensing means 32, 36 of each set 30 to produce a difference signal for each preselected, or predetermined, interval 42 along the directional axis 22 of each set 30. The computer means 44 keeps a moving or running average of the magnitude of the height variations represented by the difference signals and uses the average to compensate for any elevational differences in the positioning of the sensing means 32, 36 within each set 30 with respect to the surface 24. Since any elevational difference in the sensing means 32, 36 will be constant during the operation of the apparatus 22, it will produce a constant difference or offset in the generated difference signals. The computer means 44 calculates the running average to determine what this constant offset is and subtracts the offset from the measurements to correct the final data produced by the computer means 44. In the prototype apparatus 20, any difference signals which are recognized by the computer means 44 as faults are not included in the running average. The computer means 44 also calculates the standard deviation and variance of the difference signals and uses the variance to identify and quantify the texture of the surface 24. The variance and texture data may be obtained and compared periodically in order to calculate, quantify, and monitor raveling and weathering values of the surface 24.

Figure 5:
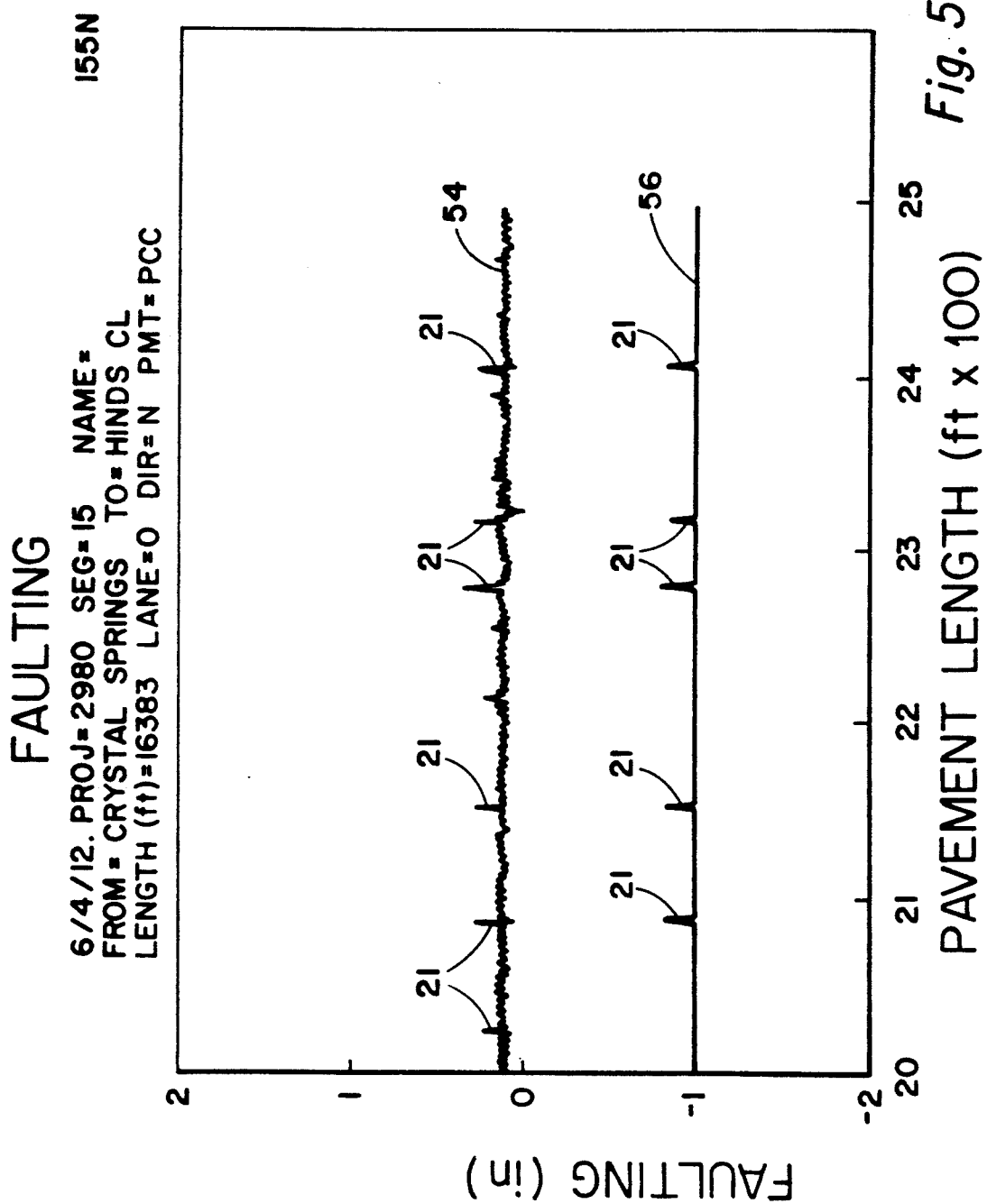
FIG. 5 is a reproduction of a graph created by the present invention.

Example FIG. 5 is a reproduction of a graph produced by the apparatus 20 for one set 30 of sensing means 32, 36. The upper curve 54 illustrates the recordation of the raw data (the height variations as calculated from the difference signals) and also illustrates the offset (approximately one-eighth inch) due to the difference in the elevation of the sensors 32, 36. The thickness or height of the upper curve 54 along the faulting axis is due to the texture of the surface 24. A very smooth surface would have a very thin horizontal line. It should be noted that the corrected curve 56 is placed by the computer means 44 on the faulting axis one inch below where it actually should be in order to avoid overlay between the raw data curve 54 and the corrected curve 56.

The lower, corrected curve 56 has been processed by the computer means 44 to delete any difference signals or faults which are not outside of a preselected range with respect to the variance or texture of the raw data. In the prototype apparatus 20, any signal which is not at least a factor of 2 greater than the variance of the raw data is ignored for the corrected curve 56. Therefore, the corrected curve 56 appears as a flat line and displays only faults 21 or height variations of a magnitude outside of the previously discussed preselected range.

The computer means 44 also will create and print a report which identifies the faults 21 which are outside the preselected range (i.e., which are large enough to merit attention), identifies the location of the faults 21, quantifies the magnitude of the faults, and identifies the project descriptors and parameters relevant for historical reference. The following is a reproduction of the first page of the report generated by the prototype apparatus 20 for the graph of FIG. 5:

FAULTING RESULTS.
Project #: 2980 Segment #: 15 Project Name: I55N
From: CRYSTAL SPRINGS To: HINDS CL
From Mile Post: 22.166 To Mile Post: 25.269
Length: 16383 Lane: 0 PMT: PCC Direction: N
Survey: 06/04/92 at: 12:55 pm Veh. ID: VIV01
Avg Speed: 49 (mph)
Op: Rudy Driver: Fred
Range Reported: Minimum = 0.125 (in) Maximum = 1.000 (in)

| Num | Start Distance | Faulting (inch) |
|---|---|---|
| 1 | 22.170 | 0.25 |
| 2 | 22.182 | 0.22 |
| 3 | 22.195 | 0.13 |
| 4 | 22.207 | 0.16 |
| 5 | 22.209 | 0.63 |
| 6 | 22.243 | 0.23 |
| 7 | 22.279 | 0.13 |
| 8 | 22.279 | −0.15 |
| 9 | 22.286 | −0.14 |
| 10 | 22.315 | 0.17 |
| 11 | 22.339 | 0.13 |
| 12 | 22.364 | 0.15 |
| 13 | 22.388 | 0.17 |
| 14 | 22.400 | 0.16 |
| 15 | 22.400 | −0.15 |
| 16 | 22.412 | 0.16 |
| 17 | 22.412 | −0.25 |
| 18 | 22.446 | 0.23 |
| 19 | 22.475 | 0.39 |
| 20 | 22.498 | 0.44 |
| 21 | 22.498 | −0.49 |
| 22 | 22.511 | 0.45 |
| 23 | 22.511 | −0.37 |
| 24 | 22.522 | 0.74 |
| 25 | 22.522 | −0.58 |
| 26 | 22.526 | 0.23 |
| 27 | 22.538 | 0.20 |
| 28 | 22.562 | 0.19 |
| 29 | 22.574 | 0.17 |
| 30 | 22.598 | 0.23 |
| 31 | 22.605 | 0.15 |
| 32 | 22.622 | 0.16 |
| 33 | 22.646 | 0.16 |
| 34 | 22.670 | 0.17 |
| 35 | 22.720 | 0.16 |
| 36 | 22.750 | 0.15 |
| 37 | 22.754 | 0.18 |
| 38 | 22.790 | 0.19 |
| 39 | 22.802 | 0.19 |
| 40 | 22.814 | 0.16 |

The data plotted in the graph and/or printed out in the report may be altered by the user. For example, the "Distance" column may be in feet (rather than thousandths of a mile) and may be measured from and to locations other than mileposts; the minimum and maximum limits of the "Range Reported" may be varied, etc.

The method for measuring height variations along a directional axis in a surface 24 includes sensing a first distance from a first sensing means 32 to a first point 34 on the surface 24 and generating a first signal indicative of the first distance; sensing a second distance from a second sensing means 36 to a second point 38 axially separated from the first point 34 on the surface 24 and generating a second signal indicative of the second distance; and calculating the difference between the first and second signals and generating and recording a difference signal, based on the difference between the first and second signals, indicative of the difference in height of the first and second points 34, 38. The method provides for providing at least two sets 30 of first and second sensing means 32, 36 and transversely spacing the sets 30 of sensing means 32, 36 from each other. The method provides for simultaneously sensing the first and second distances in order to compensate for vertical motion of the first and second sensing means 32, 36 with respect to the surface 24. The method further provides for sensing the first and second distances at preselected intervals along the surface 24; and, more preferably, provides for sensing the first and second distances at preselected intervals 42 and at a predetermined frequency in order to form a series of discrete, contiguously sensed intervals 42 along the surface 24. The method further provides for measuring the distance traveled by the vehicle and generating an odometer signal indicative of the distance traveled; and recording the odometer signal and correlating the odometer signal with the difference signal in order to identify and record the location of the height variations, as defined by the difference signal along the surface 24.

While presently preferred embodiments of the invention have been described herein for the purpose of disclosure, numerous changes in the construction and arrangement of parts and the performance of steps will suggest themselves to those skilled in the art in view of the disclosure contained herein, which changes are encompassed within the spirit of this invention, as defined by the following claims.

What is claimed is:

1. Apparatus for measuring height variations along a directional axis in a surface, such as a roadway surface, from a vehicle movable along the axis, comprising:
    a set of sensing means, comprising:
        a first sensing means for sensing a first distance from the first sensing means to a first point on the surface and generating a first signal indicative of the first distance; and
        a second sensing means for sensing a second distance from the second sensing means to a second point on the surface and generating a second signal indicative of the second distance, the second point being axially separated from the first point; and
    computer means for receiving the first and second signals, calculating the difference between the first and second signals, generating a difference signal indicative of the absolute difference in height of the first and second points, and recording the difference signal.

2. Apparatus of claim 1:
    wherein the first and second sensing means are further defined as simultaneously sensing the first and second distances in order to compensate for vertical motion of the first and second sensing means with respect to the surface.

3. Apparatus of claim 1:
    wherein the first and second sensing means are further defined as sensing the first and second distances at preselected intervals along the surface.

4. Apparatus of claim 1:
    wherein the first and second sensing means are further defined as sensing the first and second distances at preselected intervals and at a predetermined frequency in order to form a series of discrete, contiguously sensed intervals along the surface.

5. Apparatus of claim 1, comprising:
    at least two sets of sensing means, the sets being transversely spaced from each other.

6. Apparatus of claim 1, comprising:
    an odometer for measuring the distance traveled by the vehicle and generating an odometer signal; and
    wherein the computer means receives and records the odometer signal and correlates the odometer signal with the first and second signals in order to identify and record the location of the height variations, as defined by the first and second signals, along the surface.

7. Apparatus for measuring height variations along a directional axis in a surface, comprising:
    a set of sensing means, comprising:
        a first sensing means for sensing a first distance from the first sensing means to a first point on the surface and generating a first signal indicative of the first distance; and
        a second sensing means for sensing a second distance from the second sensing means to a second point on the surface and generating a second signal indicative of the second distance, the second point being axially separated from the first point;
    computer means for receiving the first and second signals, calculating the difference between the first and second signals, generating a difference signal indicative of the absolute difference in height of the first and second points, and recording the difference signal; and
    a vehicle for moving the first and second sensing means with respect to the surface.

8. Apparatus of claim 7:
    wherein the first and second sensing means are further defined as simultaneously sensing the first and second distances in order to compensate for vertical motion of the first and second sensing means with respect to the surface. to compensate for vertical motion of the first and second sensing means with respect to the surface.

9. Apparatus of claim 7:
    wherein the first and second sensing means are further defined as sensing the first and second distances at preselected intervals along the surface.

10. Apparatus of claim 7:
    wherein the first and second sensing means are further defined as sensing the first and second distances at preselected intervals and at a predetermined frequency in order to form a series of discrete, contiguously sensed intervals along the surface.

11. Apparatus of claim 7, comprising:
    at least two sets of sensing means, the sets being transversely spaced from each other.

12. Apparatus of claim 7, comprising:

an odometer for measuring the axial distance traveled by the vehicle with respect to the surface and generating an odometer signal; and wherein the computer means receives and records the odometer signal and correlates the odometer signal with the difference signal in order to identify and record the location of the height variations, as defined by the difference signal, along the surface.

13. Method of measuring height variations along a directional axis in a surface, such as a roadway surface, from a vehicle movable along the axis, comprising:

sensing a first distance from a first sensing means to a first point on the surface and generating a first signal indicative of the first distance;

sensing a second distance from a second sensing means to a second point axially separated from the first point on the surface and generating a second signal indicative of the second distance; and calculating the difference between the first and second signals and generating and recording a difference signal indicative of the absolute difference in height of the first and second points.

14. Method of claim 13, comprising:

simultaneously sensing the first and second distances in order to compensate for vertical motion of the first and second sensing means with respect to the surface.

15. Method of claim 13, comprising:

sensing the first and second distances at preselected intervals along the surface.

16. Method of claim 13, comprising:

sensing the first and second distances at preselected intervals and at a predetermined frequency in order to form a series of discrete, contiguously sensed intervals along the surface.

17. Method of claim 13, comprising:

providing at least two sets of first and second sensing means; and transversely spacing the sets of sensing means from each other.

18. Method of claim 13, comprising:

measuring the distance traveled by the vehicle and generating an odometer signal; and recording the odometer signal and correlating the odometer signal with the first and second signals in order to identify and record the location of the height variations, as defined by the first and second signals, along the surface.

19. Method for measuring height variations along a directional axis in a surface, comprising:

sensing a first distance from a first sensing means to a first point on the surface and generating a first signal indicative of the first distance;

sensing a second distance from the second sensing means to a second point axially separated from the first point on the surface and generating a second signal indicative of the second distance; and calculating the difference between the first and second signals and generating and recording a difference signal indicative of the absolute difference in height of the first and second points; and moving the first and second sensing means with respect to the surface in order to measure height variations along the directional axis.

* * * * *